United States Patent
Benedictus et al.

(10) Patent No.: US 6,192,788 B1
(45) Date of Patent: Feb. 27, 2001

(54) GRILLING APPLIANCE

(75) Inventors: Jan H. Benedictus; Klaas Kooyker, both of Drachten (NL)

(73) Assignee: U.S. Philips Corporation ( * ) Notice: Subject to any disclaimer, the term of this patent is extended or adjusted under 35 U.S.C. 154(b) by 0 days.

(21) Appl. No.: 09/525,695

(22) Filed: Mar. 14, 2000

(30) Foreign Application Priority Data

Mar. 17, 1999 (EP) .................................................. 99200814

(51) Int. Cl.$^7$ .............................. A47J 37/00; A47J 37/06; A47J 37/08
(52) U.S. Cl. .................................. 99/340; 99/349; 99/372; 99/376; 99/379; 99/385; 99/389; 219/521
(58) Field of Search ............................... 99/326–335, 337, 99/338, 349–351, 372–379, 385, 389–391, 444–450; 219/521, 537, 585, 492, 494; 100/92, 305; 426/520, 523, 512

(56) References Cited

U.S. PATENT DOCUMENTS

| 880,498 | * | 3/1908 | Bates | 99/377 |
|---|---|---|---|---|
| 1,722,127 | * | 7/1929 | Burke | 99/379 |
| 2,009,791 | * | 7/1935 | Shroyer | 99/377 |
| 2,632,379 | * | 3/1953 | Kudo | 99/375 |
| 2,719,903 | * | 10/1955 | Oertli | 219/521 X |
| 3,312,161 | * | 4/1967 | Nanna | 99/377 |
| 3,776,124 | * | 12/1973 | Morley | 99/373 X |
| 4,483,239 | * | 11/1984 | Mueller et al. | 99/349 |
| 4,484,516 | * | 11/1984 | Bimman | 99/349 |
| 4,690,044 | * | 9/1987 | Verkler | 99/372 X |
| 4,976,194 | * | 12/1990 | Kelterborn et al. | 219/492 X |
| 5,095,814 | * | 3/1992 | Ott et al. | 99/391 |
| 5,193,439 | * | 3/1993 | Finesman et al. | 99/385 |

FOREIGN PATENT DOCUMENTS

26232942c2   12/1977   (DE) .

\* cited by examiner

Primary Examiner—Timothy F. Simone
(74) Attorney, Agent, or Firm—Ernestine C. Bartlett

(57) ABSTRACT

A grilling appliance has two housing sections provided with heating plates and connected to each other by means of a pivotable/slidable hinge construction at both sides of the appliance. The housing sections can be positioned with respect to each other in several positions in which the heating plates should remain parallel to each other. In order to improve the hinge construction a parallel guiding mechanism has been provided, which mechanism comprises a U-shaped rod (9) having a central portion (10) which can slide in slots (7, 8) of the first housing section (1) and having arms (11, 12) carrying trunnions (13, 14) which are pivotable in the second housing section (2) and slidable in the first housing section (1).

2 Claims, 2 Drawing Sheets

GRILLING APPLIANCE

BACKGROUND OF THE INVENTION

The invention relates to a grilling appliance having a first and a second housing section each provided with a heating plate and heating means for heating the heating plates, which heating plates extend substantially parallel and face one another in an active grilling position, which housing sections are connected to one another both pivotably and slidably by means of two slidable hinge constructions which are situated at some distance from one another and which each have a substantially vertical slot in the first housing section and a trunnion connected to the second housing section and engaging in the respective slot of the first housing section.

Such a grilling appliance is known from DE-C2-26 23 294. These grilling appliances are also referred to as contact grilles or table-top grilles. The slidable hinge construction used in these grilling appliances allows the appliance to be opened by pivoting the housing sections with respect to each other through an angle of approximately 90°. The item of food to be grilled (for example meat) is placed onto the heating plate of the lower housing section, after which the appliance is closed by pivoting back the upper housing section, upon which the heating plate of the upper housing section comes into contact with the food to be grilled. Some appliances can even be pivoted open through 180°. The appliance can then be used as a hotplate or a regular grill. Moreover, the appliance can be cleaned easily in this position. The housing sections can perform not only a pivotal movement but also a sliding movement with respect to each other. This makes it possible to position the housing sections and, consequently, the heating plates at some distance from each other in an active grilling position. Thus, it is possible to prepare gratinated dishes, in the process of which a crisp surface is formed on the food. A drawback of such grilling appliances is that the sliding hinge construction often gives rise to canting of the two housing sections. This is caused by the fact that the two hinge constructions, which are situated at some distance from one another, are independent of each other, which during the sliding and/or pivotal movement gives rise to a sliding movement which is larger near one hinge than near the other hinge. Another drawback is that as a result of the different movements of the hinges the heating plates themselves may be positioned obliquely with respect to each other, instead of parallel, which causes the food to be heated unevenly. This is particularly undesirable in a gratinating process.

SUMMARY OF THE INVENTION

It is an object of the invention to improve a grilling appliance of the type defined in the opening paragraph in such a manner that the afore-mentioned drawback no longer occurs.

To this end, the grilling appliance is characterized in that a common parallel guiding mechanism has been provided, which mechanism comprises a substantially U-shaped rod formed by a central portion and two upright arms of the same length, said trunnions being carried by free ends of the arms, which hinge constructions each have a further, second slot in the first housing section, which second slots are each inclined with respect to the respective first-mentioned vertical slots the central portion of the U-shaped rod engaging in both second slots. The U-shaped rod ensures that during the up or down movement of the housing sections with respect to each other the forces acting on the housing sections are substantially equal in both hinge constructions. As a result of this, the movements of the housing sections with respect to each other are also substantially equal. Thus, the likelihood of canting is reduced considerably. The heating plates remain parallel to one another.

BRIEF DESCRIPTION OF THE DRAWINGS

The invention will now be described in more detail with reference to an example shown in the drawings. In the drawings

DESCRIPTION OF THE PREFERRED EMBODIMENTS

Figure 1:
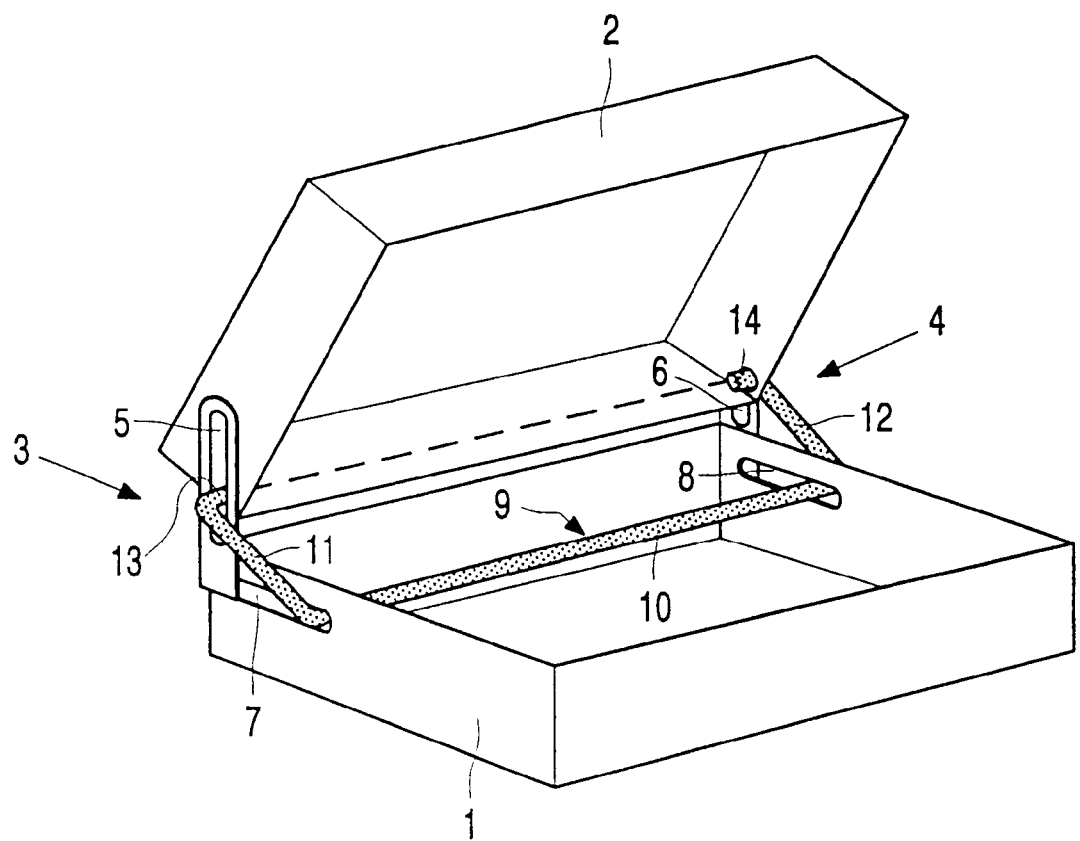
FIG. 1 is a basic perspective view of the hinge constructions for two housing sections as used in a grilling appliance.

The basic view of FIG. 1 shows a first housing section 1 and a second housing section 2, which are pivotably coupled to one another. The housing sections are shown diagrammatically as a box having a cover. Two sliding hinge constructions 3, 4 have been provided, one at the left-hand side and one at the right-hand side of the housing sections. Each hinge construction comprises first slot 5, 6, which is formed in the first housing section 1 and is oriented substantially vertically, and a second slot 7, 8, which is inclined with respect to the first slot. In the present example an angle of 90° has been chosen. However, this may also be a smaller or a larger angle. The housing sections 1, 2 are connected to one another by means of a U-shaped rod 9. The U-shaped rod comprises a central portion 10 having two upright arms 11, 12 of the same length. The free ends of the arms 11, 12 carry trunnions 13, 14. These trunnions are disposed in line with one another and are oriented substantially parallel to the central portion 10 of the rod 9. The central portion 10 of the rod 9 extends through the two second slots 7, 9. The trunnions 13, 14 each extend through the respective first slots 5 and 6 of the first housing section and are also pivotally connected to the second housing section 2. During use the second (upper) housing section 2 can not only be pivoted up or down but can also be slid up or down. Owing to the construction with the U-shaped rod 9 and the slots 5, 6 and 7, 8 a correct parallel guiding of the two housing sections 1, 2 with respect to each other is achieved.

Figure 2:
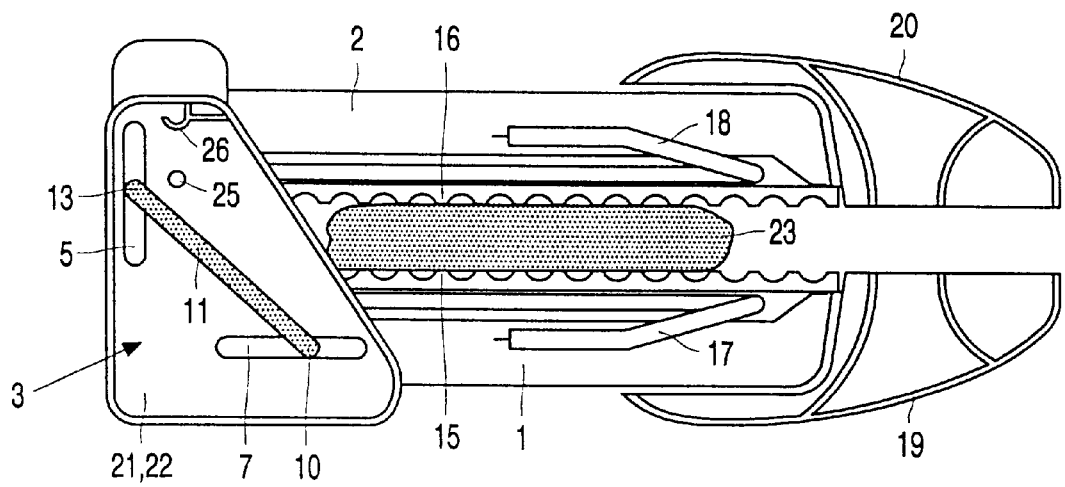
FIG. 2 is a diagrammatic side view of a grilling appliance in a first grilling position, where the hinge construction of FIG. 1 is used.
Figure 3:
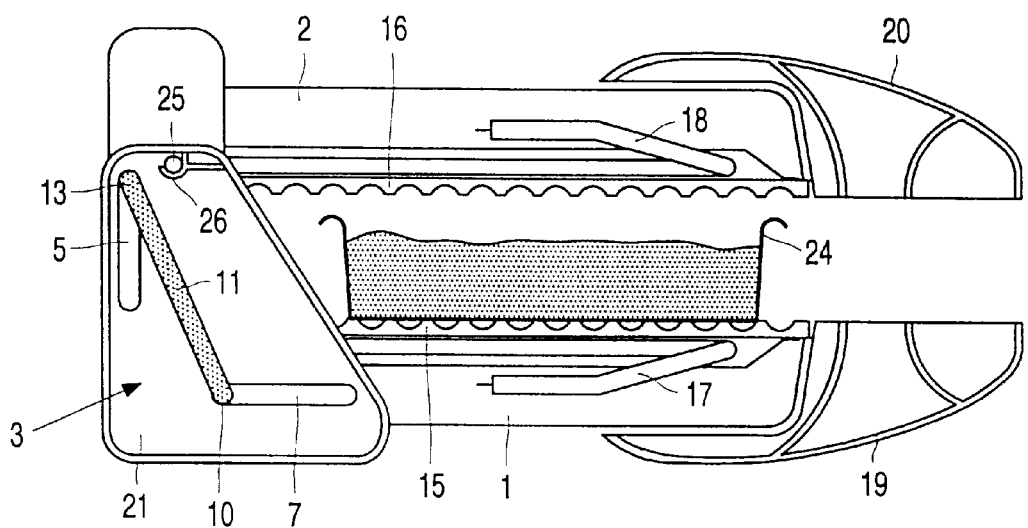
FIG. 3 is a diagrammatic side view of the grilling appliance as shown in FIG. 2, but now in a second grilling position.

FIGS. 2 and 3 are side views of a grilling appliance using the parallel guiding construction as described hereinbefore. Like parts bear the same reference numerals as in FIG. 1. The housing sections 1 and 2 each include a heating plate (also referred to as grill plate), 15 and 16 respectively, and a heating element, 17 and 18 respectively. For the operation of the appliance each of the housing sections further has a handle, 19 and 20 respectively. Since FIGS. 2 and 3 are side views only one hinge construction 3 is visible. The slots 5, 6 and 7, 8 are situated in respective flanges 21 and 22 (the flange 22 is not visible) secured to the lower first housing section 1. The first housing section 1 is usually placed on a table. The item of food to be grilled, for example a slice of meat 23, is placed onto the lower heating plate 15, after which the appliance is closed by pivoting the lower housing section 2. For grilling meat the upper heating plate 16 is generally in contact with the meat in order to obtain adequate contact heat. The distance between the heating plates is then automatically adapted to the thickness of the meat. However, the grilling appliance is also used for the preparation of gratinated food, i.e. to form a crisp surface on the food. Such food is then usually contained in a dish 24 or the like. The upper heating plate 16 should then be positioned at some distance above the food. For this, it is very important that the heating plates extend parallel to each other. The hinge construction in accordance with the invention ensures a correct parallel guiding. For the positioning of the upper housing section 2 in this grilling position the housing section 2 has a projection 25 and the flange 21 has a seating 26. Positioning is effected by pivoting the upper housing section 2 upward and subsequently sliding it upward. During this movement the trunnions 13, 14 are moved through the slots 5, 6 and the central portion 10 of the rod 9 is moved through the slots 7, 8. The projection 25 can thus be positioned above the seating 26. When the upper housing section 2 is now pivoted back into the horizontal position the projection 25 engages the seating 26. The trunnion 13 is then situated in the upper part of the slot 5. In this way the upper housing section 2 is locked in this grilling position. The projection 25 and the seating 26 which cooperates therewith may obviously be arranged at both sides of the appliance. However, there are also alternative constructions for positioning the housing sections at a distance from one another (see for example DE-C2-26 23 294).

What is claimed is:

1. A grilling appliance having a first and a second housing section each provided with a heating plate and heating means for heating the heating plates, which heating plates extend substantially parallel and face one another in an active grilling position, which housing sections are connected to one another both pivotably and slidably by means of two slidable hinge constructions which are situated at some distance from one another and which each have a substantially vertical slot in the first housing section and a trunnion connected to the second housing section and engaging in the respective slot of the first housing section, wherein a common parallel guiding mechanism has been provided, which mechanism comprises a substantially U-shaped rod formed by a central portion and two upright arms of the same length, said trunnions being carried by free ends of the arms, which hinge constructions each have a further, second slot in the first housing section, which second slots are each inclined with respect to the respective first-mentioned vertical slots, the central portion of the U-shaped rod engaging in both second slots.

2. A grilling appliance as claimed in claim 1, wherein positioning means have been provided by which the two housing section can be positioned at some distance from each other and parallel to each other.

* * * * *